(12) United States Patent
Ballew et al.

(10) Patent No.: US 8,145,837 B2
(45) Date of Patent: Mar. 27, 2012

(54) COMPUTER STORAGE SYSTEM WITH REDUNDANT STORAGE SERVERS AND AT LEAST ONE CACHE SERVER

(75) Inventors: James D. Ballew, Grapevine, TX (US); Shannon V. Davidson, Hillsboro, MO (US)

(73) Assignee: Raytheon Company, Waltham, MA (US)

( * ) Notice: Subject to any disclaimer, the term of this patent is extended or adjusted under 35 U.S.C. 154(b) by 896 days.

(21) Appl. No.: 11/969,109

(22) Filed: Jan. 3, 2008

(65) Prior Publication Data

US 2008/0168221 A1 Jul. 10, 2008

Related U.S. Application Data

(60) Provisional application No. 60/883,272, filed on Jan. 3, 2007.

(51) Int. Cl.
*G06F 12/00* (2006.01)
*G06F 13/00* (2006.01)
*G06F 13/28* (2006.01)

(52) U.S. Cl. ............... 711/113; 711/118; 714/6.3
(58) Field of Classification Search ............ 711/113
See application file for complete search history.

(56) References Cited

U.S. PATENT DOCUMENTS

| | | | |
|---|---|---|---|
| 5,459,857 A | 10/1995 | Ludlam et al. | 395/182.04 |
| 6,009,481 A * | 12/1999 | Mayer | 710/33 |
| 6,587,921 B2 | 7/2003 | Chiu et al. | |
| 6,675,264 B2 | 1/2004 | Chen et al. | |
| 6,792,507 B2 * | 9/2004 | Chiou et al. | 711/119 |
| 6,820,171 B1 | 11/2004 | Weber et al. | 711/114 |
| 6,941,396 B1 | 9/2005 | Thorpe et al. | |
| 6,944,785 B2 | 9/2005 | Gadir et al. | |
| 6,976,134 B1 | 12/2005 | Lolayekar et al. | |
| 6,977,927 B1 | 12/2005 | Bates et al. | |
| 6,996,674 B2 | 2/2006 | Chiu et al. | |
| 7,039,765 B1 | 5/2006 | Wilkes | |
| 7,127,633 B1 | 10/2006 | Olson et al. | 714/4 |
| 7,139,811 B2 | 11/2006 | Lev Ran et al. | |
| 7,171,522 B2 | 1/2007 | Watanabe et al. | |
| 7,185,062 B2 | 2/2007 | Lolayekar et al. | |
| 7,231,430 B2 | 6/2007 | Brownell et al. | |
| 7,299,334 B2 | 11/2007 | Zohar et al. | |
| 7,340,555 B2 | 3/2008 | Ashmore et al. | |
| 7,386,662 B1 | 6/2008 | Kekre et al. | |

(Continued)

OTHER PUBLICATIONS

PCT; International Search Report and Written Opinion; (IS/EPO) for PCT/US2008/050086 (15 pages), Mar. 1, 2008.

(Continued)

*Primary Examiner* — Brian Peugh
*Assistant Examiner* — Prasith Thammavong
(74) *Attorney, Agent, or Firm* — Cantor Colburn LLP

(57) ABSTRACT

According to one embodiment, a computer storage system includes one or more redundant storage servers coupled to one or more cache servers. A redundant storage server is coupled to each disk server. A disk server comprises at least one mass storage disk operable to store data. The data is segmented according to logical blocks, where each logical block has an associated logical block identifier. The redundant storage servers are operable to replicate each logical block of at least two of the disk servers. The cache servers comprise a cache memory and are coupled to each redundant storage server. Each cache server is operable to access the replicated logical blocks according to the associated logical block identifiers, and cache, in the cache memory, the replicated logical block according to the associated logical block identifier.

21 Claims, 2 Drawing Sheets

U.S. PATENT DOCUMENTS

| | | |
|---|---|---|
| 7,487,235 B2 | 2/2009 | Andrews et al. |
| 2002/0103889 A1 | 8/2002 | Markson et al. |
| 2002/0133511 A1* | 9/2002 | Hostetter et al. .............. 707/204 |
| 2002/0188711 A1 | 12/2002 | Meyer et al. |
| 2003/0018927 A1 | 1/2003 | Gadir et al. |
| 2003/0097607 A1 | 5/2003 | Bessire |
| 2003/0233427 A1 | 12/2003 | Taguchi |
| 2004/0123033 A1* | 6/2004 | Rudelic ......................... 711/118 |
| 2004/0148376 A1 | 7/2004 | Rangan et al. |
| 2004/0250031 A1* | 12/2004 | Ji et al. ........................ 711/162 |
| 2007/0038749 A1* | 2/2007 | Noya et al. .................... 709/226 |
| 2007/0299995 A1 | 12/2007 | Hoese et al. |

OTHER PUBLICATIONS

Communication Pursuant to Article 94(3) EPC for Application No. 08 713 443.3-2224 from EPO (9 pages), Nov. 5, 2009.

* cited by examiner

US 8,145,837 B2

COMPUTER STORAGE SYSTEM WITH REDUNDANT STORAGE SERVERS AND AT LEAST ONE CACHE SERVER

RELATED APPLICATIONS

This application claims benefit under 35 U.S.C. §119(e) of U.S. Patent Application Ser. No. 60/883,272, entitled "LOW COST COMPUTER STORAGE SYSTEM," which was filed on Jan. 3, 2007.

TECHNICAL FIELD OF THE DISCLOSURE

This disclosure relates to computer storage systems, and more particularly, to a computer storage system and a method of operating the same.

BACKGROUND OF THE DISCLOSURE

Storage area networks have been developed to meet the complex computing requirements of large organizations. A storage area network enables distributed access to data stored in one or more disk servers. The distributed nature of the network provides for storage of relatively large amounts of data and enables the use of redundancy that allows for increased availability.

SUMMARY OF THE DISCLOSURE

According to one embodiment, a computer storage system includes one or more redundant storage servers coupled to one or more cache servers. A redundant storage server is coupled to each disk server. A disk server comprises at least one mass storage disk operable to store data. The data is segmented according to logical blocks, where each logical block has an associated logical block identifier. The redundant storage servers are operable to replicate each logical block of at least two of the disk servers. The cache servers comprise a cache memory and are coupled to each redundant storage server. Each cache server is operable to access the replicated logical blocks according to the associated logical block identifiers, and cache, in the cache memory, the replicated logical block according to the associated logical block identifier.

Certain embodiments may provide numerous technical advantages. A technical advantage of one embodiment may be that redundant disk servers, storage servers, and cache servers provide a relatively fault tolerant computer storage system having relatively high availability.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Storage area networks (SANs) couple mass storage disks to clients through a network. Large entities, such as corporations, may use an array of mass storage disks coupled together through a storage area network to store a relatively large amount of data. Servers may use high performance protocols, such as a fiber channel (FC) protocol to provide access to the data. Storage systems utilizing these high performance networks, however, may be relatively expensive to implement and maintain.

Figure 1:
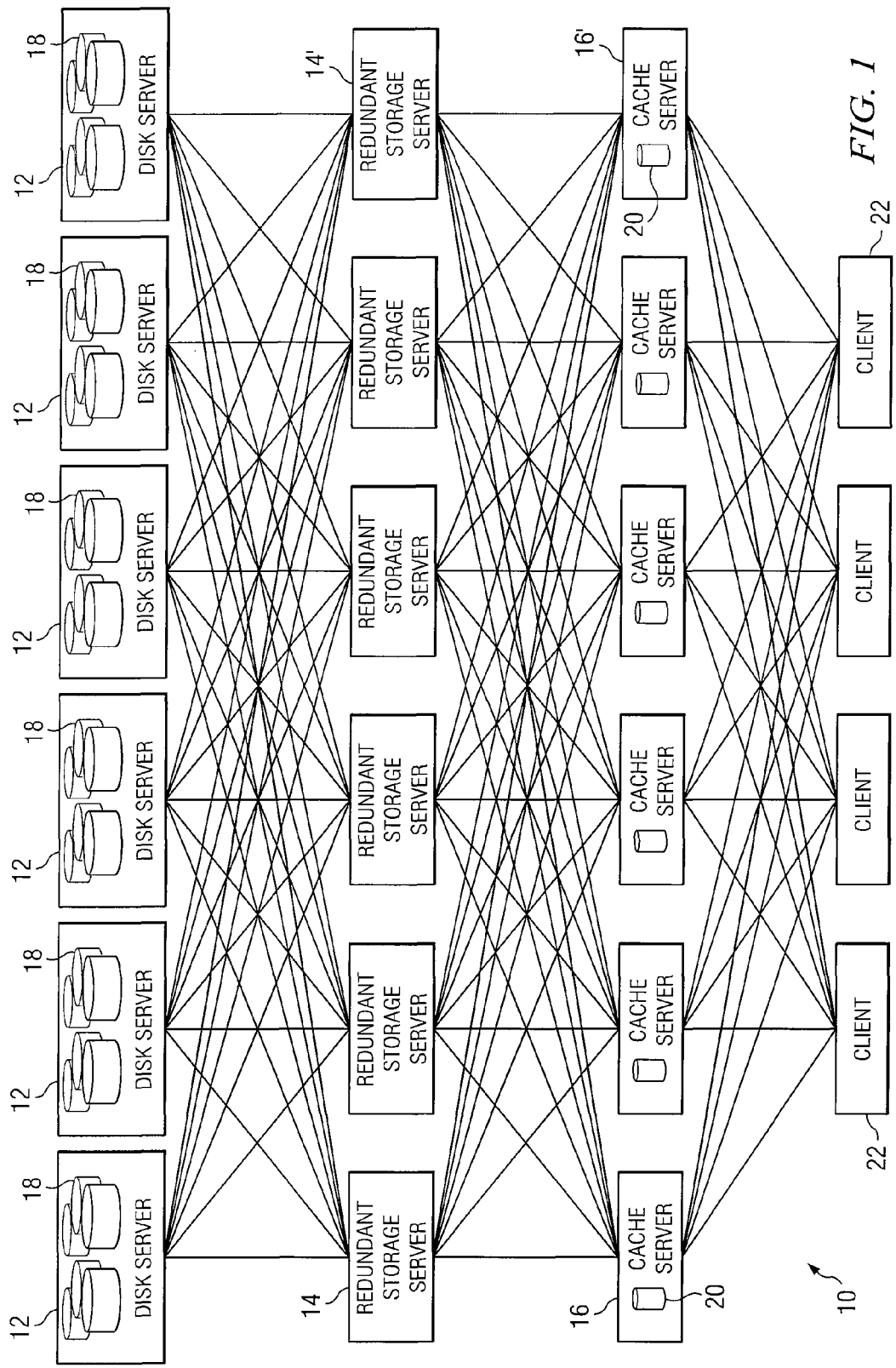
FIG. 1 is a block diagram showing one embodiment of a computer storage system according to the teachings of the present disclosure.

FIG. 1 shows one embodiment of a computer storage system 10. Computer storage system 10 includes one or more disk servers 12, one or more redundant storage servers 14, and one or more cache servers 16 that store data that is accessed by one or more clients 22. Data may be stored in one or more mass storage disks 18 configured in each disk server 12. Each redundant storage server 14 may be coupled to each disk server 12. Each cache server 16 may be coupled to each redundant storage server 14. As will be described in greater detail below, computer storage system 10 may provide a storage architecture with a high degree of performance and availability.

Disk servers 12 store data in mass storage disks 18. Mass storage disks 18 may have any suitable capacity, such as greater than or equal to 32 tera-bytes of data. Data in mass storage disks 18 may be accessed at any suitable access rate, such as greater than or equal to 200 Giga-bytes per second.

Data may be segmented in mass storage disks 18 according to logical blocks. Logical blocks generally comprise a portion of useable memory of a mass storage disk 18. The capacity of each logical block generally corresponds with the physical structure of the memory portion of the mass storage disk 18. Logical block identifiers are associated with each logical block. Logical blocks may be accessed according to their associated logical block identifiers.

Redundant storage servers 14 are operable to redundantly store data that is in disk servers 12. Each disk server 12 may have eight 500 Giga-byte mass storage disks 18 with a serial advanced technology attachment (SATA) interface, operating at 7200 revolutions-per-minute (RPM). If a disk server 12 fails, redundant storage server 14 can provide data. In one embodiment, redundant storage servers 14 may comprise a spare redundant storage server 14' that operates in place of a failed redundant storage server 14. A redundant storage server 14 may transmit a heartbeat messages to the other redundant storage servers 14. If a valid response is not received, the redundant storage server 14 transfers operation of the unresponsive redundant storage server 14 to the spare redundant storage server 14'.

In one embodiment, redundant storage servers 14 are implemented according to a Redundant Array of Inexpensive Disk (RAID) protocol; such as a Redundant Array of Inexpensive Disks level 5 (RAID-5) protocol. Any suitable data replication protocol, however, may be used.

Each redundant storage server 14 may be coupled to each disk server 12 using any storage area network protocol. Examples of storage area network protocols include an Internet small computer system interface (iSCSI) protocol, an advanced technology attachment over the Ethernet (AoE) protocol, an Infiniband protocol, a peripheral component interconnect express (PCIe) protocol, or an Ethernet over serial advanced technology attachment (eSATA) protocol. Storage area network protocols provide disk servers 12 access to data that is stored in logical blocks according to their logical block identifiers.

Cache servers 16 are coupled between clients 22 and redundant storage servers 14. Each cache server 16 may be coupled to each of the redundant storage servers 14. Cache servers 16 access data that is in redundant storage servers 14 and store the data in cache memory 20. Cache memory 20 may be implemented as a level-1 cache. Cache memory 20 may provide up to 96 Giga-bytes of storage and an access rate of up to 400 Giga-bytes per second. Cache servers 16 are described in more detail with reference to FIGS. 2A and 2B.

If a redundant storage server 14 fails, a cache server 16 may provide the data. In one embodiment, cache servers 16 may comprise a spare cache server 16' that operates in place of a failed cache server 16. A cache server 16 may transmit a heartbeat messages to another cache server 16. If a valid response is not received, the cache server 16 transfers operation of the unresponsive cache server 16 to the spare cache server 16'.

Cache servers 16 may be coupled to redundant storage servers 14 and clients 22 using any suitable storage area network protocol. Examples of protocols may include those described with reference to redundant storage system 14. The storage area network protocol may provide clients 22 access to data stored in logical blocks according to their associated logical block identifiers.

Disk servers 12, redundant storage servers 14, and cache servers 16 may have any suitable configuration. In one example, disk servers 12, redundant storage servers 14, and cache servers 16 may comprise commercial-off-the-shelf computing systems having a single socket, dual-core processor. Disk servers 12 and redundant storage servers 14 may be implemented with at least 2 Giga-bytes of system memory, while cache servers 16 may be implemented with at least 12 Giga-bytes of system memory.

Modifications, additions, or omissions may be made to computer storage system 10 without departing from the scope of the invention. The components of computer storage system 10 may be integrated or separated. For example, the operations of cache server 16 may be integrated with redundant storage servers 14. Moreover, the operations of computer storage system 10 may be performed by more, fewer, or other components. For example, disk servers 12 may have any suitable number of mass storage disks 18. Additionally, operations of computer storage system 10 may be performed using any suitable logic comprising software, hardware, and/or other logic. As used in this document, "each" refers to each member of a set or each member of a subset of a set.

Figure 2:
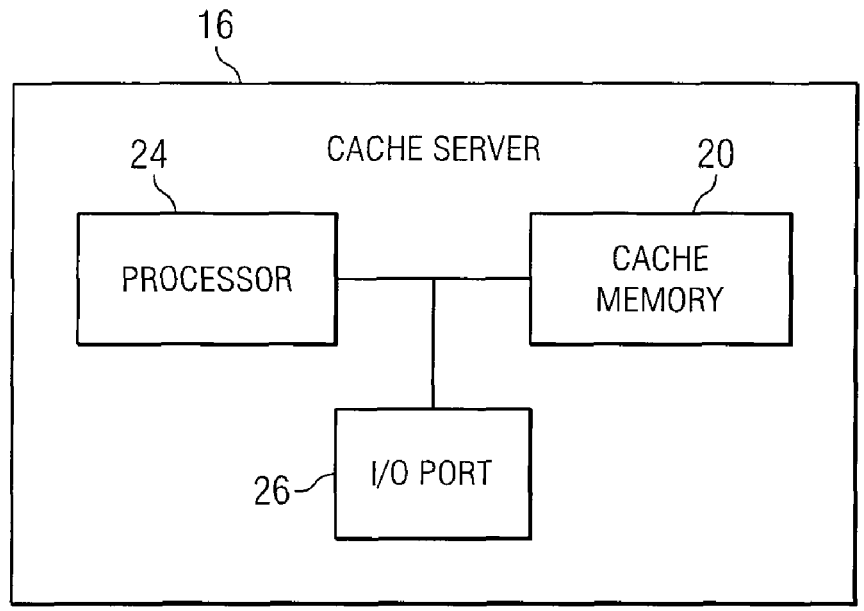
FIG. 2 is a diagram showing one embodiment of a cache server of the computer storage system of FIG. 1.

FIG. 2 shows an embodiment of a cache server 16 of FIG. 1. Cache server 16 includes a processor 24, a cache memory 20, and one or more input/output ports 26. Processor 24 executes instructions stored in cache memory 20. Input/output port 26 couples processor 24 to redundant storage servers 14 and clients 22.

Cache server 16 may comprise any suitable computing system, such as a personal computer, laptop computer, or mainframe computer. In one embodiment, cache server 16 is a blade server that can be placed in a rack among other blade servers. In another embodiment, cache server 16 may comprise a commercial off-the-shelf (COTS) computer having a system memory that may operate as cache memory 20. Cache memory 20 may be any suitable type of memory available for use with commercial off-the-shelf computers, such as dynamic random access memory (DRAM) or static random access memory (SRAM). In another embodiment, cache memory 20 may be implemented as a Level-1 cache.

In one embodiment, cache servers 16 may distribute data over each of the cache servers 16. In this manner, cache memory 20 may be provided by the system memories of a number of commercial off-the-shelf mother boards implemented as cache servers 16.

A portion of data stored in mass storage disks 18 as logical blocks may be replicated in cache memory 20 as logical blocks. Client 22 may access data from cache memory 20 more quickly than from mass storage disks 18. In one embodiment, logical blocks may be formatted according to a Linux block devices that are commonly referred to as logical unit number identifiers (LUNs).

Cache servers 16 may receive requests from clients 22 and either forward the request to redundant storage servers 14 or access the data from a cache memory 20 if available. If the data is retrieved directly from cache memory 20, time latency of a response to the client's request for data may be reduced.

In one embodiment, processor 24 may select a portion of logical blocks for storage in cache memory 20 according to a least-recently-used process. That is, processor 24 may cull logical blocks of data from cache memory 20 that have been accessed less than other logical blocks.

In a particular embodiment incorporating a number of cache servers 16, logical blocks may be striped over each cache server 16 according to a least significant block address of the logical block identifier. Client 22 may direct requests for data to an appropriate cache server 16 by reading each block address identifier prior to access of the data. In this manner, clients 22 may correctly ascertain the cache server 16 that contains the desired data.

Figure 3:
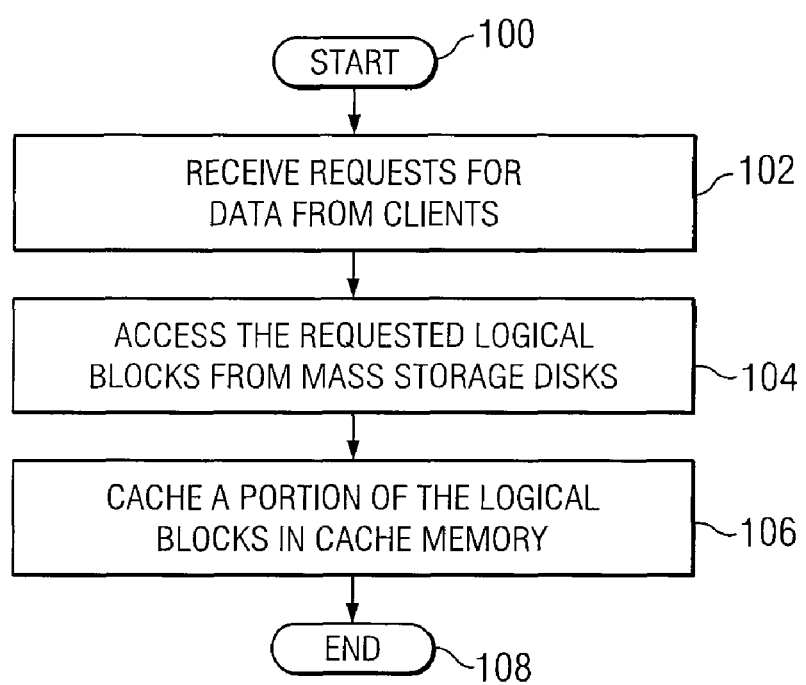
FIG. 3 is a flowchart showing one embodiment of a series of steps that may be taken by the computer storage system of FIG. 1.

FIG. 3 shows one embodiment of a series of steps that may be taken by computer storage system 10. In step 100, the process is initiated.

In step 102, cache server 16 receives requests for data from client 22. The requests may include logical block identifiers associated with logical blocks containing the requested data. In one embodiment, cache server 16 may be one of a number of cache servers 16 that are striped according to the least significant block address of the logical block identifiers associated with the logical blocks.

In step 104, cache server 16 accesses the requested logical blocks from mass storage disks 18. In one embodiment, cache server 16 may be coupled to mass storage disks 18 through a storage area network such that the requested logical blocks may be accessed according to their associated logical block identifiers.

In step 106, cache server 16 caches a portion of the requested logical blocks in cache memory 20. In one embodiment, the portion of logical blocks are cached according to a least-recently-used process. In this manner, logical blocks that are accessed relatively more often may be stored in cache memory 20 for relatively quick access on subsequent access requests from client 22. Cache memory 20 stores often used data such that requests for data by clients 22 may be served from cache servers 16, thus alleviating throughput latency of accessing data through disk servers 12.

In step 108, the process ends.

Modifications, additions, or omissions may be made to the method without departing from the scope of the disclosure. The method may include more, fewer, or other steps. For example, cache server 16 may access the data from a spare redundant storage server 14 that operates in place of a failed redundant storage server 14.

Although the present disclosure describes several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A computer-implemented storage system comprising:
 a plurality of redundant storage servers, each redundant storage server coupled to each of a plurality of disk servers through a respective communication path, each communication path between a redundant storage server and a disk server not including an additional redundant storage server, each disk server having at least one mass storage disk operable to store data, the data segmented according to a plurality of logical blocks, each logical block having an associated logical block identifier, the plurality of redundant storage servers operable to:
  replicate each logical block of at least two of the plurality of disk servers; and
 at least one cache server comprising a cache memory, the at least one cache server coupled to each redundant storage server, the at least one cache server operable to:
  receive a request from a client coupled to the at least one cache server, the request comprising a plurality of logical block identifiers of data stored by the plurality of disk servers that are coupled to the plurality of redundant storage servers;
  access the replicated logical blocks according to the plurality of logical block identifiers; and
  cache, in the cache memory, a portion of the replicated logical blocks according to the plurality of logical block identifiers.

2. The computer-implemented storage system of claim 1, wherein the plurality of redundant storage servers comprise a spare redundant storage server operable to:
 operate in place of another redundant storage server if the other redundant storage server fails.

3. The computer-implemented storage system of claim 1, wherein the plurality of redundant storage servers comprise a spare redundant storage server, each of the plurality of redundant storage servers operable to:
 transmit a heartbeat message to another redundant storage server; and
 transfer operation of the other redundant storage server to the spare redundant storage server if a response to the heartbeat message is not received.

4. The computer-implemented storage system of claim 1, wherein the at least one cache server comprises a plurality of cache servers, the plurality of cache servers comprise a spare cache server that is operable to operate in place of another cache server if the other cache server fails.

5. The computer-implemented storage system of claim 1, wherein the at least one cache server comprises a plurality of cache servers, the plurality of cache servers comprise a spare cache server, each of the plurality of cache servers operable to:
 transmit a heartbeat message to another cache server; and
 transfer operation of the other cache server to the spare cache server if a response to the heartbeat message is not received.

6. The computer-implemented storage system of claim 1, wherein the plurality of redundant storage servers are coupled to each of the plurality of storage servers using a storage area network protocol.

7. The computer-implemented storage system of claim 1, wherein the plurality of redundant storage servers are coupled to each of the plurality of storage servers using a storage area network protocol selected from the group consisting of Internet small computer system interface (iSCSI), advanced technology attachment over the Ethernet (AoE), Infiniband, peripheral component interconnect express (PCIe), and Ethernet over serial advanced technology attachment (eSATA).

8. The computer-implemented storage system of claim 1, wherein the at least one cache server is coupled to each of the plurality of redundant storage servers using a storage area network protocol.

9. The computer-implemented storage system of claim 1, wherein the at least one cache server is coupled to each of the plurality of redundant storage servers using a storage area network protocol selected from the group consisting of Internet small computer system interface (iSCSI), advanced technology attachment over the Ethernet (AoE), Infiniband, peripheral component interconnect express (PCIe), and Ethernet over serial advanced technology attachment (eSATA).

10. The computer-implemented storage system of claim 1, wherein the at least one cache server is further operable to:
 cache the portion of the replicated logical blocks according to a least-recently-used (LRU) process.

11. The computer-implemented storage system of claim 1, wherein the plurality of redundant storage servers are configured together according to Redundant Array of Inexpensive Disks level 5 (RAID-5) protocol.

12. A computer-implemented method comprising:
 accessing, by a plurality of redundant storage servers, a plurality of disk servers, each redundant storage server coupled to each disk server through a respective communication path, each communication path between a redundant storage server and a disk server not including an additional redundant storage server, each disk server having at least one mass storage disk operable to store data, the data segmented according to a plurality of logical blocks, each logical block having an associated logical block identifier;
 replicating each logical block of at least two of the plurality of disk servers;
 receiving, by at least one cache server, a request from a client coupled to the at least one cache server, the request comprising a plurality of logical block identifiers of data stored by the plurality of disk servers that are coupled to the plurality of redundant storage servers;
 accessing, by the at least one cache server, the replicated logical blocks according to the plurality of logical block identifiers, the at least one cache server comprising a cache memory, the at least one cache server coupled to each redundant storage server; and
 caching, in the cache memory, a portion of the plurality of replicated logical blocks according to the plurality of logical block identifiers.

13. The computer-implemented method of claim 12, the accessing the replicated logical blocks according to the associated plurality of logical block identifiers further comprising:
 accessing the replicated logical block through a spare redundant storage server, the spare redundant storage operating in place of another redundant storage server that has failed.

14. The computer-implemented method of claim 12, further comprising:
 transmitting a heartbeat message to another redundant storage server; and
 transferring operation of the other redundant storage server to a spare redundant storage server if a response to the heartbeat message is not received.

15. The computer-implemented method of claim 12, the accessing the replicated logical blocks according to the associated plurality of logical block identifiers further comprising:
accessing the replicated logical block through a spare cache server, the spare cache server operating in place of another cache server that has failed.

16. The computer-implemented method of claim 12, further comprising:
transmitting a heartbeat message to another cache server; and
transferring operation of the other cache server to a spare cache server if a response to the heartbeat message is not received.

17. The computer-implemented method of claim 12, wherein the plurality of redundant storage servers are coupled to each of the plurality of storage servers using an Ethernet protocol.

18. The computer-implemented method of claim 12, wherein the plurality of redundant storage servers are coupled to each of the plurality of storage servers using a protocol selected from the group consisting of Internet small computer system interface (iSCSI), advanced technology attachment over the Ethernet (AoE), Infiniband, peripheral component interconnect express (PCIe), and Ethernet over serial advanced technology attachment (eSATA).

19. The computer-implemented method of claim 12, wherein the portion of the replicated logical blocks are cached according to a least-recently-used (LRU) process.

20. The computer-implemented storage method of claim 12, wherein the plurality of redundant storage servers are configured together according to Redundant Array of Inexpensive Disks level 5 (RAID-5) protocol.

21. A computer-implemented storage system comprising:
a plurality of redundant storage servers, each redundant storage server coupled to each of a plurality of disk servers using a storage area network protocol through a respective communication path, each communication path between a redundant storage server and a disk server not including an additional redundant storage server, each disk server having a plurality of mass storage disks operable to store data, the data segmented according to a plurality of logical blocks, each logical block having an associated logical block identifier, the plurality of redundant storage servers comprising a spare redundant storage server, the plurality of redundant storage servers operable to:
replicate each logical block of at least two of the plurality of disk servers; and
a plurality of cache servers each comprising a cache memory, each cache server coupled to each redundant storage server using a storage area network protocol, the plurality of cache servers comprising a spare cache server, each cache server operable to:
receive a request from a client coupled to the respective cache server, the request comprising a plurality of logical block identifiers of data stored by the plurality of disk servers that are coupled to the plurality of redundant storage servers;
access the plurality of replicated logical blocks according to the plurality of logical block identifiers; and
cache, in the cache memory of the respective cache server, a portion of the replicated plurality of logical blocks according to the plurality of logical block identifiers.

* * * * *